(12) United States Patent
Kudoh et al.

(10) Patent No.: US 9,311,256 B2
(45) Date of Patent: Apr. 12, 2016

(54) STORAGE DEVICE

(71) Applicant: Kabushiki Kaisha Toshiba, Minato-ku (JP)

(72) Inventors: Yoshiyuki Kudoh, Kawasaki (JP); Yasuto Aramaki, Kawasaki (JP); Taichiro Yamanaka, Hino (JP); Hiroki Udagawa, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 42 days.

(21) Appl. No.: 14/475,936

(22) Filed: Sep. 3, 2014

(65) Prior Publication Data
US 2015/0356028 A1  Dec. 10, 2015

Related U.S. Application Data

(60) Provisional application No. 62/009,453, filed on Jun. 9, 2014.

(51) Int. Cl.
*G06F 12/14* (2006.01)
*H04L 9/14* (2006.01)

(52) U.S. Cl.
CPC .............. *G06F 12/1408* (2013.01); *H04L 9/14* (2013.01); *G06F 2212/1052* (2013.01); *H04L 2209/24* (2013.01)

(58) Field of Classification Search
CPC ................. G06F 2212/1052; G06F 12/1408
See application file for complete search history.

(56) References Cited

U.S. PATENT DOCUMENTS

| | | | |
|---|---|---|---|
| 6,769,060 B1 * | 7/2004 | Dent | H04L 9/0844 713/168 |
| 7,392,401 B2 | 6/2008 | Kohara et al. | |
| 8,584,216 B1 * | 11/2013 | Allen | H04L 9/0836 380/277 |
| 2001/0037438 A1 * | 11/2001 | Mathis | G06F 21/51 711/163 |
| 2004/0230819 A1 | 11/2004 | Takahashi | |
| 2008/0170686 A1 * | 7/2008 | Nemoto | H04L 9/0637 380/42 |
| 2008/0229115 A1 * | 9/2008 | Wollnik | G06F 21/14 713/190 |
| 2009/0129590 A1 * | 5/2009 | Konuma | H04L 9/0838 380/44 |
| 2009/0196417 A1 | 8/2009 | Beaver et al. | |
| 2013/0159731 A1 * | 6/2013 | Furukawa | H04L 9/0861 713/189 |

(Continued)

FOREIGN PATENT DOCUMENTS

| | | |
|---|---|---|
| JP | 2004-341768 | 12/2004 |
| JP | 4112188 | 7/2008 |
| JP | 2009-225437 | 10/2009 |

*Primary Examiner* — Dao Ho
*Assistant Examiner* — Ali Shayanfar
(74) *Attorney, Agent, or Firm* — Oblon, McClelland, Maier & Neustadt, L.L.P.

(57) ABSTRACT

A storage device includes a non-volatile memory having a plurality of storage areas. Received data is encrypted with a first cryptographic key and stored in one of the storage areas. Upon receiving an request from a host, a key processor replaces the first cryptographic key used to encrypt data stored on a specified one of the non-volatile memories with a different cryptographic key not previously used for any of the storage areas by generating a second cryptographic key, converting the previously used keys into first value by an operation, converting the candidate key into a second value by the same operation. The first and second values are compared, and when the first information is not the same as the second information, the second cryptographic key replaces the first cryptographic key, and when not, the second cryptographic key is discarded and a new second cryptographic key generated.

8 Claims, 2 Drawing Sheets

(56) References Cited

U.S. PATENT DOCUMENTS

2013/0179684 A1* 7/2013 Furukawa ............ G06F 21/602 713/165

2015/0288514 A1* 10/2015 Pahl ..................... H04L 9/085 713/171

* cited by examiner

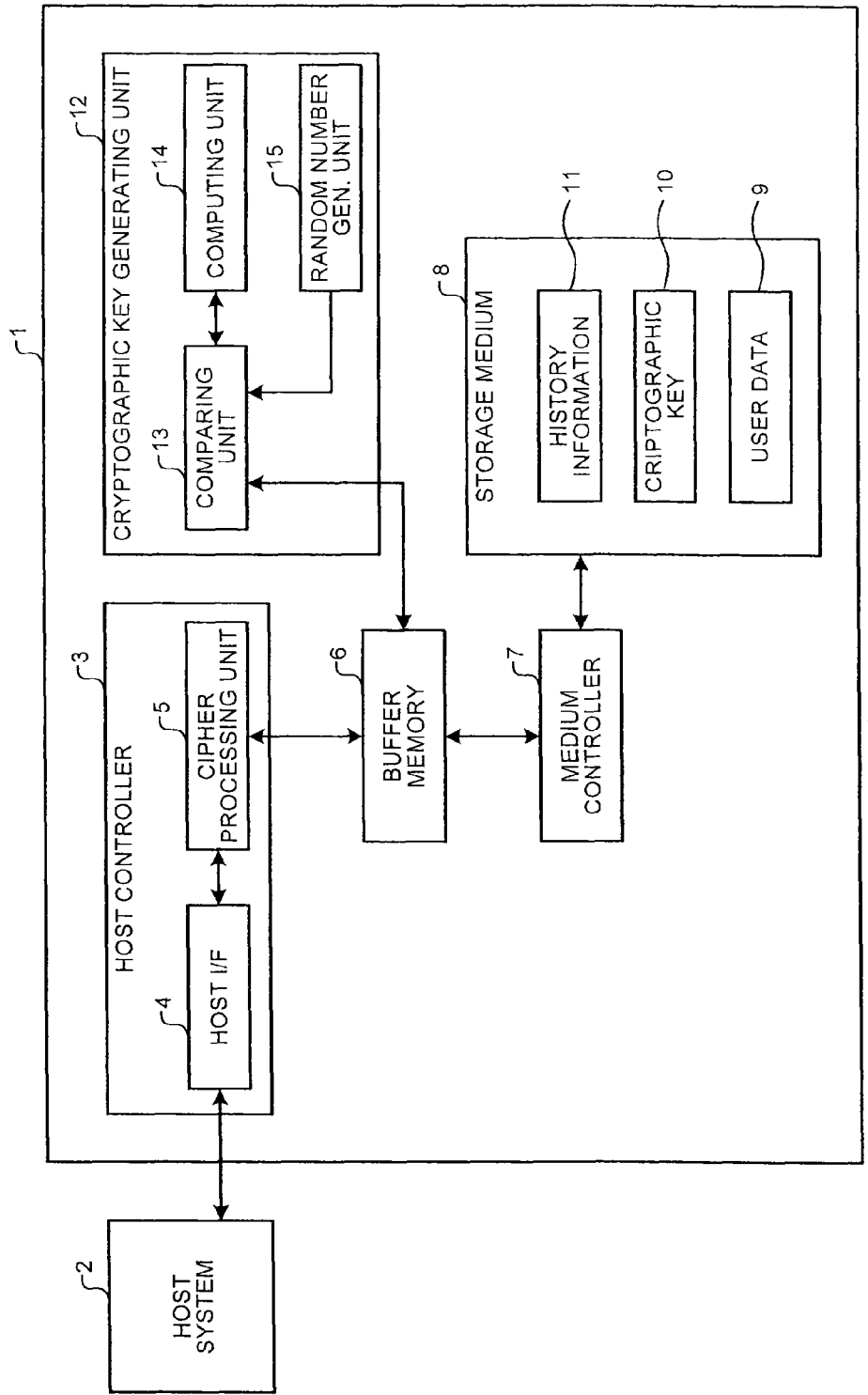

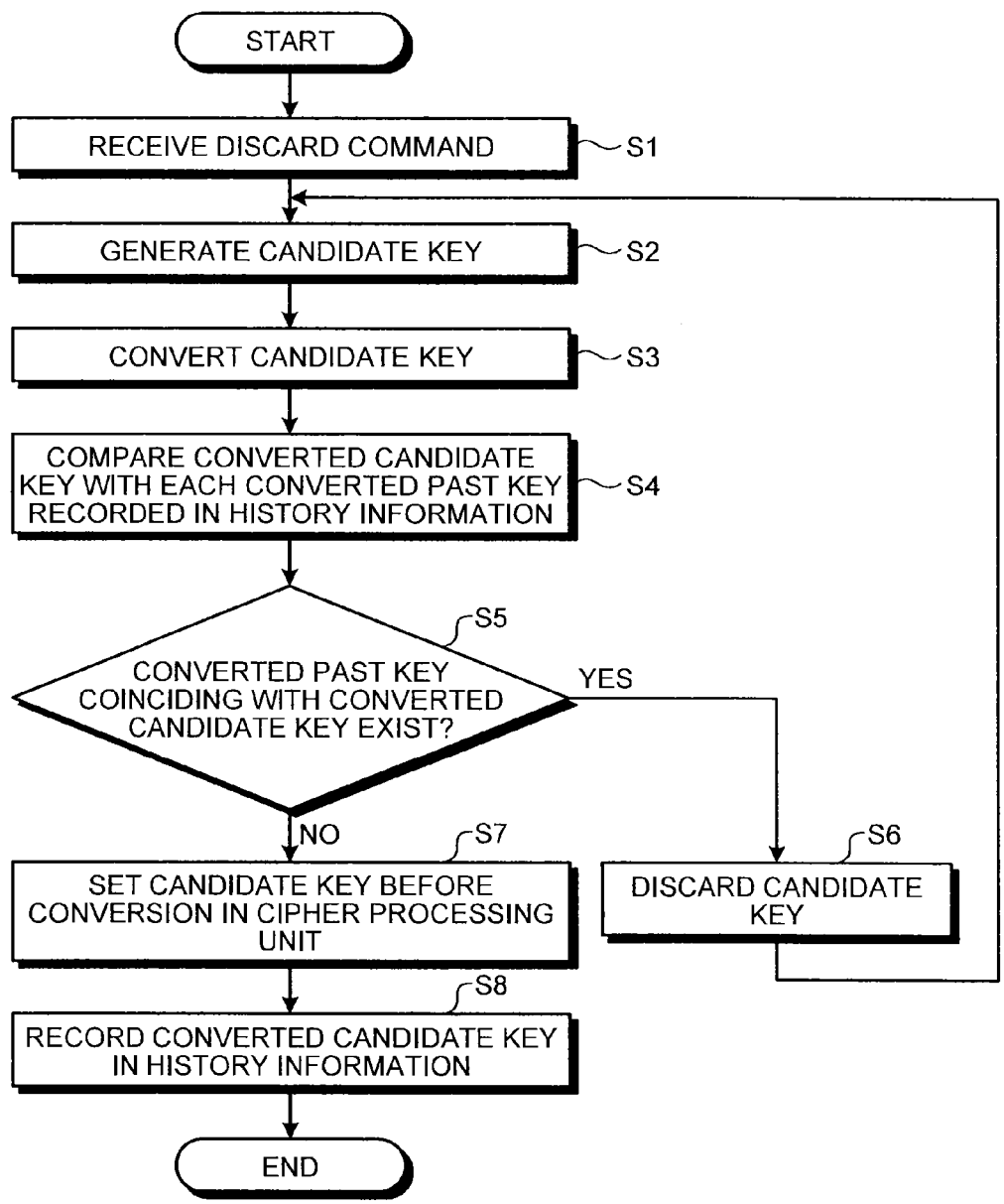

STORAGE DEVICE

CROSS-REFERENCE TO RELATED APPLICATIONS

This application is based upon and claims the benefit of priority from U.S. Provisional Application No. 62/009,453, filed on Jun. 9, 2014; the entire contents of which are incorporated herein by reference.

FIELD

Embodiments described herein relate generally to a storage device.

BACKGROUND

Conventionally, there have been storage devices which have a function to encrypt data. A cryptographic key is used in encrypting data. When data in the storage device is being discarded, the cryptographic key is changed. Changing the cryptographic key can make the data unusable more quickly than erasing the data itself.

BRIEF DESCRIPTION OF THE DRAWINGS

FIG. 1 is a block diagram showing the configuration of a storage device of an embodiment; and FIG. 2 is a flow chart for explaining the operation of the storage device of the embodiment.

DETAILED DESCRIPTION

In general, according to one embodiment, a storage device comprises a cipher processing unit, a first non-volatile memory, and a key processing unit. The cipher processing unit encrypts data from the outside using a cryptographic key. The first non-volatile memory stores the data encrypted by the cipher processing unit. The key processing unit replaces a first cryptographic key having been used by the cipher processing unit with a second cryptographic key that is different from the first cryptographic key according to a request from the outside. The key processing unit comprises a candidate key generating unit, a history managing unit, a computing unit, and a comparing unit. The candidate key generating unit generates a candidate key. The history managing unit converts the first cryptographic key into first information by an operation and stores the first information. The computing unit converts the candidate key into second information by the operation. The comparing unit reads out the first information from the history managing unit, compares the read-out first information and the second information, and, if the read-out first information and the second information do not coincide, determines the candidate key as the second cryptographic key and, if the read-out first information and the second information coincide, discards the candidate key.

Exemplary embodiments of the storage device will be explained below in detail with reference to the accompanying drawings. The present invention is not limited to the following embodiments.

Embodiment

FIG. 1 is a block diagram showing the configuration of a storage device of the embodiment. The storage device 1 is connected to a host system 2. The storage device 1 functions as an external storage device for the host system 2. The host system 2 is a computer. The computer includes, for example, a CPU (Central Processing unit), a personal computer, a portable computer, or a portable communication terminal. The host system 2 can issue a write command to write data and a read command to read out data to the storage device 1. Further, the host system 2 can issue a discard command to the storage device 1. The discard command is a command to discard all the data stored in the storage device 1. The discard command is used, for example, for a user to prevent the others from reading out data in the storage device 1, when ending the use of the storage device 1.

The storage device 1 comprises a host controller 3, a buffer memory 6, a medium controller 7, a storage medium 8, and a cryptographic key generating unit 12.

The host controller 3 performs the control of data transfer between the host system 2 and the buffer memory 6. Further, the host controller 3 can control the medium controller 7 and the cryptographic key generating unit 12 according to commands from the host system 2. The host controller 3 comprises a host I/F 4 and a cipher processing unit 5.

The host I/F 4 is a communication interface that performs data communication between the storage device 1 and the host system 2. The cipher processing unit 5 encrypts data received from the host system 2 using a cryptographic key 10 to send to the buffer memory 6. Further, the cipher processing unit 5 decrypts data in the buffer memory 6 using the cryptographic key 10 to send to the host system 2 via the host I/F 4.

The buffer memory 6 functions as a data-transfer cache, a work-area memory, and the like between the host system 2 and the storage medium 8. The buffer memory 6 is constituted by, e.g., a volatile memory such as a DRAM (Dynamic Random Access Memory). Note that instead of the DRAM, a non-volatile random access memory such as an FeRAM (Ferroelectric RAM), MRAM (Magnetoresistive RAM), or PRAM (Phase change RAM) can be used as the buffer memory 6.

The medium controller 7 performs the control of data transfer between the buffer memory 6 and the storage medium 8.

The storage medium 8 is a non-volatile memory that functions as storage. The storage medium 8 is constituted by, e.g., a flash memory, a magnetic disk, an optical disk, or a combination thereof. When the storage device 1 of the embodiment is applied to a hard disk drive, the hard disk corresponds to the storage medium 8. Where the storage device 1 of the embodiment is applied to an SSD (Solid State Drive), the memory chip of the NAND-type flash memory corresponds to the storage medium 8.

The storage medium 8 stores data from the host system 2 as user data 9. The user data 9 has been encrypted by the cipher processing unit 5 using the cryptographic key 10. Also the storage medium 8 stores the cryptographic key 10. The cryptographic key 10 in the storage medium 8 is read out at the start-up and set in the cipher processing unit 5. In order to make it impossible for unauthorized users to access the cryptographic key 10 in the storage medium 8, predetermined protection is put on the cryptographic key 10 in the storage medium 8.

When the storage device 1 receives a discard command, the cryptographic key generating unit 12 changes the cryptographic key 10. The cryptographic key generating unit 12 generates a new cryptographic key 10 which does not coincide with any of the used cryptographic keys 10. Note that herein, the used cryptographic keys 10 include the cryptographic keys 10 used in the past and the cryptographic key 10 currently in use. The cryptographic keys 10 that were used are referred to as past keys. The cryptographic key generating unit 12 comprises a comparing unit 13, a computing unit 14, and a random number generating unit 15.

The random number generating unit 15 generates a random number. The random number generated by the random number generating unit 15 is a candidate for the new cryptographic key 10. The random number generated by the random number generating unit 15 is referred to as a candidate key. The candidate key is sent to the computing unit 14 via the comparing unit 13. The computing unit 14 performs a predetermined operation on the received candidate key to convert the candidate key.

Any algorithm can be used as the algorithm of the operation by the computing unit 14 as long as it has the property of converting the same two input values into the same output values respectively and two different input values into output values different from each other. For example, any encryption algorithm, hash operation, or HMAC operation can be adopted as the algorithm of the operation by the computing unit 14. In the case of an encryption algorithm, the computing unit 14 encrypts a preset fixed character string using the candidate key as a cryptographic key. In the case of a hash operation, the computing unit 14 changes the candidate key into a hash. In the case of an HMAC operation, the computing unit 14 changes a preset fixed character string into a hash using the candidate key as a secret key.

The comparing unit 13, the computing unit 14, and the storage medium 8 cooperate to function as a history managing unit that converts each of the used cryptographic keys 10 according to the above predetermined algorithm to store the converted cryptographic keys 10 therein.

That is, the past keys are converted by the same operation as is performed on the candidate key and are recorded in history information 11. The comparing unit 13 compares each of the past keys recorded in the history information 11 and the candidate key. If the candidate key does not coincide with any of the past keys, the comparing unit 13 sets the candidate key before conversion as a new cryptographic key 10 in the cipher processing unit 5. The user data 9 stored in the storage medium 8 has been encrypted with use of one of the past keys. Because the user data 9 stored in the storage medium 8 cannot be decrypt with use of the new cryptographic key 10, substantially the same condition is realized as the condition where the user data 9 has been discarded.

Some or all of the cipher processing unit 5, the medium controller 7, the comparing unit 13, the computing unit 14, and the random number generating unit 15 are realized by hardware, software, or a combination thereof. The realization by software means that a function is realized by a computing device executing a program. The host controller 3, the cryptographic key generating unit 12, and the medium controller 7 may be housed in one package and configured as a transfer controller that performs data transfer between the storage medium 8 and the host system 2. The buffer memory 6 may be provided in the transfer controller or provided, as an entity separate from the transfer controller, in the storage device 1.

FIG. 2 is a flow chart for explaining the operation of the storage device 1 of the embodiment. When the host controller 3 receives a discard command via the host I/F 4 (S1), the random number generating unit 15 generates a candidate key (S2). The random number generating unit 15 is started up by the host controller 3 to start the process of S2. The generated candidate key is sent via the comparing unit 13 to the computing unit 14, and the computing unit 14 converts the received candidate key (S3).

The comparing unit 13 compares the converted candidate key with each of the converted past keys recorded in the history information 11 (S4). The history information 11 is read by the medium controller 7 from the storage medium 8 into the buffer memory 6. The comparing unit 13 reads each of the converted past keys from the history information 11 read into the buffer memory 6.

The comparing unit 13 determines whether the converted candidate key and any of the converted past keys recorded in the history information 11 coincide (S5). If the converted candidate key and any of the converted past keys recorded in the history information 11 coincide (Yes at S5), the comparing unit 13 discards the candidate key (S6) and performs the process of S2 again.

If the converted candidate key does not coincide with any of the converted past keys recorded in the history information 11 (No at S5), the comparing unit 13 sets the candidate key before conversion in the cipher processing unit 5 (S7). By this means, the cryptographic key 10 that the cipher processing unit 5 uses is changed. The cryptographic key 10 after the change is written into the storage medium 8 in such a way as to be overwritten. Further, the comparing unit 13 records the converted candidate key in the history information 11 (S8). Specifically, the converted candidate key is added by the comparing unit 13 to the history information 11 read into the buffer memory 6. The history information 11 after the addition is written by the medium controller 7 into the storage medium 8 in such a way as to be overwritten. After the process of S8, the storage device 1 finishes the operation according to the discard command.

As such, according to the embodiment, the storage device 1 comprises the cryptographic key generating unit 12 that replaces the cryptographic key 10 used by the cipher processing unit 5 with a new cryptographic key. The new cryptographic key is different from the past keys. Since the new cryptographic key is different from the past keys, it is possible to reliably make the user data 9 encrypted using a past key unreadable. The cryptographic key generating unit 12 comprises the computing unit 14 that converts past keys by the predetermined operation. The converted past keys are recorded in the history information 11. Because the converted past keys, not past keys in plain text, are recorded, the security of management of the history information 11 can be improved.

The cryptographic key generating unit 12 comprises the computing unit 14 that converts the candidate key by the predetermined operation. The comparing unit 13 compares the converted candidate key with each of the converted past keys recorded in the history information 11. If the converted candidate key and any of the converted past keys recorded in the history information 11 coincide, the comparing unit 13 discards the candidate key. If the converted candidate key does not coincide with any of the converted past keys recorded in the history information 11, the comparing unit 13 sets the candidate key before the conversion as a new cryptographic key 10 in the cipher processing unit 5. Thus, it is possible to reliably make the user data 9 unreadable, and the security of management of the history information 11 can be improved.

Although in the above it has been described that the history information 11 is stored in the storage medium 8, it may be stored in a non-volatile memory different from the storage medium 8.

Or the storage medium 8 may comprise a plurality of areas, and the cipher processing unit 5 may perform encryption using a cryptographic key different for each area. In this case, for example, the discard command includes a statement specifying one of the plurality of areas. The cryptographic key generating unit 12 replaces the cryptographic key on the specified area with a new cryptographic key. The history information 11 is created for each area.

A functional element group (hereinafter called an encryption element group) formed of the cipher processing unit 5, the comparing unit 13, the history managing unit, the computing unit 14, and the random number generating unit 15 may be mounted in the host system 2, not in the storage device 1. The history information 11 may be stored in a storage area in the host system 2 or in a storage area (e.g., the storage medium 8) in the storage device 1. In the host system 2, the cipher processing unit 5 encrypts data to be sent to the storage device 1 using the cryptographic key 10. Also, in the host system 2, the cipher processing unit 5 decrypts data received from the storage device 1 using the cryptographic key 10. The history managing unit converts past keys in the host system 2 to store the converted past keys as the history information 11 in a storage area in the host system 2 or in a storage area in the storage device 1. When a discard command is issued from the host system 2, the random number generating unit 15 generates a candidate key. The computing unit 14 converts the candidate key in the host system 2. The comparing unit 13 reads the converted past keys from the history information 11 stored in the storage area in the host system 2 or in the storage area in the storage device 1. The comparing unit 13 compares each of the converted past keys and the converted candidate key. If any of the converted past keys and the converted candidate key coincide, the comparing unit 13 discards the candidate key. If none of the converted past keys coincides with the converted candidate key, the comparing unit 13 sets the candidate key as a new cryptographic key 10 in the cipher processing unit 5. The history managing unit converts the new cryptographic key 10 to record in the history information 11.

If the storage medium 8 is constituted by one or more memory chips, an encryption element group may be mounted in each memory chip. In the memory chip, the cipher processing unit 5 encrypts data sent from the medium controller 7 using the cryptographic key 10. Also in the memory chip, the cipher processing unit 5 decrypts data to be sent to the medium controller 7 using the cryptographic key 10. The history managing unit converts past keys in the memory chip to store the converted past keys as the history information 11 in a storage area in the memory chip. When a discard command is issued from the host system 2, the random number generating unit 15 in the memory chip generates a candidate key. The computing unit 14 in the memory chip converts the candidate key. The comparing unit 13 reads each of the converted past keys from the history information 11 stored in the storage area in the memory chip. The comparing unit 13 compares each of the converted past keys and the converted candidate key. If any of the converted past keys and the converted candidate key coincide, the comparing unit 13 discards the candidate key. If none of the converted past keys coincides with the converted candidate key, the comparing unit 13 sets the candidate key as a new cryptographic key 10 in the cipher processing unit 5. The history managing unit converts the new cryptographic key 10 to record in the history information 11.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
a cipher processor that receives data from a host and encrypts the data received from the host using a first cryptographic key;
a first non-volatile memory that stores the data encrypted by the cipher processor; and
a key processor that replaces a first cryptographic key having been used by the cipher processor with a cryptographic key that is different from the first cryptographic key according to a request from the host,
wherein the key processor comprises:
a key generator that generates a second cryptographic key;
a history manager that converts the first cryptographic key and past cryptographic keys previously used to encrypt received data into first information by an operation and stores the first information, said operation having a property of converting the same two input values into the same output values respectively and two different input values into output values different from each other;
a converter processor that converts the second cryptographic key into second information by the same operation used to convert the first cryptographic key and the past cryptographic keys into said first information; and
a comparator that reads out the first information from the history manager, compares the read-out first information and the second information, and when the read-out first information and the second information have different values, replaces the first cryptographic key with the second cryptographic key and when the read-out first information and the second information have the same values, discards the second cryptographic key and generates a new second cryptographic key,
wherein the first non-volatile memory comprises a plurality of storage areas,
wherein the cipher processor uses a different cryptographic key for each of the plurality of storage areas, and
wherein the request specifies one of the plurality of storage areas.

2. The storage device according to claim 1, further comprising a second non-volatile memory that stores the second cryptographic key.

3. The storage device according to claim 1, wherein the operation is an operation for encryption the same as or different from encryption performed by the cipher processor.

4. The storage device according to claim 1, wherein the operation is an operation that hashes the first cryptographic key or the second cryptographic key.

5. The storage device according to claim 1, wherein the operation is an operation that hashes a preset fixed character string using the the first cryptographic key or the second cryptographic key as a secret key.

6. The storage device according to claim 1, wherein the first non-volatile memory is a NAND-type flash memory.

7. The storage device according to claim 1, wherein the first non-volatile memory is a hard disk.

8. A non-transitory computer readable medium for storing computer-readable instructions for encrypting data and storing the encrypted data on a storage area of a non-volatile memory including a plurality of storage areas, the computer-readable instructions when executed by a computer, causing the computer to perform the following steps:
encrypting received data using a first cryptographic key associated with one of said plurality of non-volatile memories and storing the encrypted data on said one of the plurality of storage areas, wherein a different cryptographic key is used for each of the plurality of storage areas; and replacing the first cryptographic key associated with said one of the plurality of storage areas with a cryptographic key different from the first cryptographic key according to a request from a host specifying said one of the plurality of storage areas, including generating a second cryptographic key;

converting the first cryptographic key and past cryptographic keys previously used to encrypt received data into first information by an operation and storing the first information, said operation having a property of converting the same two input values into the same output values respectively and two different input values into output values different from each other;

converting the second cryptographic key into second information by the same operation used to convert the first cryptographic key and the past cryptographic keys into said first information; and comparing the first information and the second information, and when the first information and the second information have different values, replacing the first cryptographic key of said one of the plurality of storage areas with the second cryptographic key, and when the first information and the second information have the same values, discarding the second cryptographic key and generating a new second cryptographic key.

* * * * *